US008533523B2

(12) United States Patent
Tylutki

(10) Patent No.: US 8,533,523 B2
(45) Date of Patent: Sep. 10, 2013

(54) DATA RECOVERY IN A CROSS DOMAIN ENVIRONMENT

(75) Inventor: Marcus A. Tylutki, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 12/913,228

(22) Filed: Oct. 27, 2010

(65) Prior Publication Data
US 2012/0110369 A1 May 3, 2012

(51) Int. Cl.
*G06F 11/00* (2006.01)
(52) U.S. Cl.
USPC ............................................................. 714/2
(58) Field of Classification Search
USPC .................. 714/2, 3, 20, 4.1; 707/999.202
See application file for complete search history.

(56) References Cited

U.S. PATENT DOCUMENTS

| | | | | |
|---|---|---|---|---|
| 6,393,386 | B1* | 5/2002 | Zager et al. | 703/25 |
| 6,453,345 | B2* | 9/2002 | Trcka et al. | 709/224 |
| 6,718,481 | B1* | 4/2004 | Fair | 714/4.12 |
| 6,799,258 | B1* | 9/2004 | Linde | 711/162 |
| 7,523,348 | B2 | 4/2009 | Anand et al. | |
| 2003/0051026 | A1 | 3/2003 | Carter | |
| 2004/0083284 | A1* | 4/2004 | Ofek et al. | 709/224 |
| 2007/0136603 | A1 | 6/2007 | Kuecuekyan | |
| 2007/0226438 | A1* | 9/2007 | Erofeev | 711/162 |
| 2009/0172687 | A1* | 7/2009 | Bobak et al. | 718/104 |
| 2009/0182784 | A1 | 7/2009 | Rohit et al. | |
| 2010/0138395 | A1 | 6/2010 | D'Souza et al. | |
| 2011/0154367 | A1* | 6/2011 | Gutjahr et al. | 719/316 |

FOREIGN PATENT DOCUMENTS

| | | |
|---|---|---|
| CN | 101321319 A | 12/2008 |
| WO | WO 2010033644 A1 | 3/2010 |

OTHER PUBLICATIONS

Bai, Kun and Liu, Peng; "A Data Damage Tracking Quarantine and Recovery (DTQR) Scheme for Mission-Critical Database Systems;" EDBT 2009: Mar. 24-26, 2009; pp. 720-731.*
Juchang Lee et al., :Differential Logging: A Commutative and Associative Logging Scheme for Highly Parallel Main Memory Database, 2001.

* cited by examiner

*Primary Examiner* — Scott Baderman
*Assistant Examiner* — Joseph Kudirka
(74) *Attorney, Agent, or Firm* — Sawyer Law Group, P.C.

(57) ABSTRACT

A method for recovering data when corrupted data from a source is detected includes identifying data corrupted as a result of using the corrupted data by tracing propagation of the corrupted data to provide identified corrupted data, and repairing the identified corrupted data to provide repaired data. The propagation of the corrupted data is traced from one domain to another. Data in both domains is repaired. A wrapper is provided for the source. Calls into and out of the source are intercepted by the wrapper. Calls of a plurality of different domains are intercepted by the wrapper. A wrapper is provided for a process. External service calls of the process are intercepted by the wrapper. The wrapper recreates a process flow followed by the process in accordance with the corrupted data. A wrapper is provided for a database. Accesses of the database are intercepted by the wrapper.

17 Claims, 6 Drawing Sheets

DATA RECOVERY IN A CROSS DOMAIN ENVIRONMENT

BACKGROUND OF THE INVENTION

1. Field of Invention

This invention relates to the field of data recovery, and in particular, it relates to the field of data recovery in cross domain environments.

2. Description of Related Art

Many methods are known in the prior art for safeguarding the security of data transmissions between businesses, which are primarily interested in the information integrity within their own systems and within the services they provide. Additionally, policies and techniques for addressing the integrity of information persisting through communication channels between components are known in the prior art. However, when information passing through multiple domains is compromised, data recovery must often be handled using inefficient ad hoc procedures, and in a manual way.

U.S. Patent Pub. No. 2010/0138395 A1, entitled "Enterprise Service Availability Through Identity Preservation," and published Jun. 3, 2010, teaches automated recovery of server service and attempting to maintain data integrity. The method can be used, for example, in disaster recovery situations. A shadowing service provides a high availability backup in order to handle data corruption. However, it does not address the problem of data recovery when the data passes through multiple domains.

U.S. Pat. No. 7,523,348, entitled "Method And System For Monitoring And Managing Archive Operations," discloses a data protection system having a production location, a storage location, and a communication path for transmitting data between the production location and the storage location. If a task of an archive job is not successful, a determination is made whether any other tasks of the archive job are dependent upon the failed task, since they may have also failed. Makeup jobs are generated for the failed tasks. However, the disclosed data protection system does not include a method suitable for extending data protection beyond the production location environment.

U.S. Patent Pub. No. 2009/0182784 A1, entitled "Recovery Point Identification In CDP Environments," and published Jul. 16, 2009, discloses a method of identifying a recovery point in a Continuous Data Protection (CDP) log. The disclosed method detects corrupted data in the CDP log and identifies the nature of the corruption. The operations are performed in response to, for example, virus attacks, malfunctioning storage controllers, and other causes. The disclosed method can then find a time instance of uncorrupted data, and determine whether the corrupted data affects other events. The determination whether the corrupted data affects other events is a probabilistic determination.

U.S. Patent Pub. No. 2007/0136603 A1, entitled "Method And Apparatus For Providing Secure Access Control For Protected Information," and published Jun. 14, 2007, discloses a method for transmitting indicia representative of information from a first domain to a second domain in response to a request. A determination is made whether the requestor is authorized to perform the operation. However, the disclosed method does not include an adequate method for performing data recovery if contaminated data is transmitted between the domains.

U.S. Patent Pub. No. 2003/0051026 A1, entitled "Network Surveillance And Security System," and published Mar. 13, 2003, discloses a system for protecting the integrity of information in computer networks using a knowledge base of security events. The disclosed integrity protection method uses the knowledge base to track network communication traffic from inception throughout its duration within the network. However, the integrity operations do not address data recovery across multiple components.

BRIEF SUMMARY OF THE INVENTION

A method for recovering data when corrupted data from a source is detected includes identifying data corrupted as a result of using the corrupted data by tracing propagation of the corrupted data to provide identified corrupted data, and repairing the identified corrupted data to provide repaired data. The propagation of the corrupted data is traced from a first domain to a second domain. Data in both the first domain and the second domain is repaired. A wrapper is provided for the source. Calls into and out of the source are intercepted by the wrapper. Calls of a plurality of different domains are intercepted by the wrapper. A wrapper is provided for a process. External service calls of the process are intercepted by the wrapper. The wrapper recreates a process flow followed by the process in accordance with the corrupted data. A wrapper is provided for a database. Accesses of the database are intercepted by the wrapper. The accesses of the database are intercepted in accordance with a time window defined by a bad write to the database and a good write to the database. Good data corresponding to the corrupted data and a timestamp corresponding to the corrupted data are determined. Corrected data is determined in accordance with the good data and the timestamp. Identified corrupted data is repaired in accordance with the corrected data. A list of accesses of corrupted data is compiled in accordance with the good data and the timestamp. The identified corrupted data is repaired in accordance with the list. The list is trimmed in accordance with a good write. The identified corrupted data is marked as tainted. The identified corrupted data is marked as untainted after it is repaired.

The data recovery method of the present invention provides a mechanism for reporting and recovering from information integrity issues across multiple domains, for example the domains of multiple businesses and/or multiple platforms, including different businesses and platforms in cloud environments. In addition to addressing information integrity in the communication channels between the components of the multiple domain environment, the data recovery method of the invention addresses information integrity in the remainder of the paths of the information flow through the multiple domains that may be contaminated by a single, local event. Furthermore, information integrity in the entire paths of information flow through the multiple domains can be addressed even if the single, local event is not detected during transmission of contaminated information. The method of the invention is suitable for any kinds of cross domain cloud architectures, including those in Service Oriented Architecture (SOA) environments.

The method of the invention can include three phases. The first phase, the identify phase, can substantially be a propagation process, in which determinations are made which pieces of information are contaminated. Appropriate reversibility handlers can be notified accordingly. In the second phase, the repair phase, the corrupted data can be either repaired or deleted. In the simplest case, corrupted data can be deleted, when the original data may be unrecoverable. For example, corrupted data can be deleted when a request is corrupted due to causes such as an intermittent connection, a bad hard drive sector or a human input error discovered, for example, after an audit. Additionally, when a reversibility handler receives a notification that data is contaminated, it can attempt to repair the contamination if needed, and can send additional notifications. Transaction logs of the reversibility handlers and records of corrupted values may be created and archived for auditing purposes, for example by banks and financial institutions. The archiving of this information may be performed on a separate database. In the third phase, the untaint phase, data can be marked as untainted. The third phase can begin after the repair phase is complete.

Cross domain business process flows can be very complex. They may require some original inputs in order to start a transaction, and many additional inputs as they continue to process the transaction. Each piece of information that the transaction produces for another service can also be contaminated if the original inputs are contaminated. Once a reversibility handler is notified that previously used transaction data is contaminated, it can match the timestamp and identification of the transaction to identify the inputs used when the contaminated data was processed. The reversibility handler can then trace through the process to discover which additional requests were made by the transaction, and send the appropriate notifications.

Some requests that a reversibility handler is notified to address may be relatively benign. For example, a service may merely record a request to its database. If the request is corrupt, then it may not be worth repairing the log record. Under these circumstances the request may be safely ignored. In cases where a request log is used to correlate data analysis, it may be worth repairing.

There can be simple and complex methods of tracing the path of information contamination through multiple domain environments. Simple methods can monitor all of the outputs produced by a transaction that had a contaminated input, and send simple notification requests that the results may be contaminated. More complex methods may be able to infer which outputs produced by the transaction are affected by the contaminated input. This improves the accuracy of the propagate contamination notices that are created. Furthermore, this effectively primes the tree of contamination notices that are produced. Some methods may even infer what the values of the data could be if it was not contaminated.

BRIEF DESCRIPTION OF SEVERAL VIEWS OF THE DRAWINGS

Preferred embodiments of the invention will be described in conjunction with the following drawings in which like reference numerals designate like elements and wherein.

DETAILED DESCRIPTION OF THE INVENTION

Figure 1:
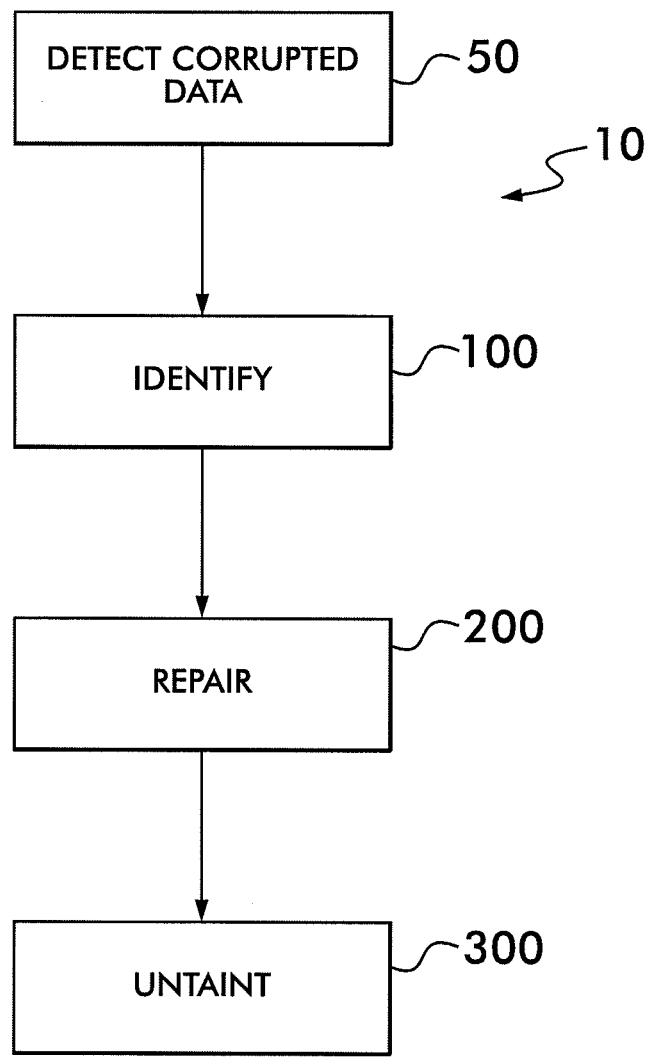
FIG. 1 shows a high level block diagram representation of an embodiment of the data recovery method of the present invention.

Referring now to FIG. 1, there is shown a high level block diagram presentation of a preferred embodiment of the phases of the data recovery method 10 of the present invention. The data recovery method 10 of the present invention can be performed when corrupted data is detected as shown in block 50.

In the identify phase 100 of the data recovery method 10 corrupted data is located and marked as tainted. Accordingly, determinations are made regarding the source of the data corruption, and the extent to which the data corruption has spread. In order to make these determinations the corrupted data and the good data are determined. Additionally, a timestamp indicating the last time that the data was known to be correct is determined in the identify phase 100. Methods for detecting corrupted data and its source, and determining the corresponding good data and its timestamp, are known in the art. Any known method for making these determinations can be used with the data recovery method 10.

If data corruption has occurred the corrupted data may have propagated from a single source, for example an object such as a process or a database, through any number of different processes or databases. Furthermore, the processes and databases receiving and propagating the corrupted data can be located in any number of different domains. Therefore, in the identify phase 100 of the data recovery method 10 can provide the process or database that is the source of the corrupted data with a wrapper. The wrapper is a program that can intercept all calls into and out of the process or database that is the source of the corrupted data. A wrapper provided to a source of corrupted data in the data recovery method 10 can be referred to as a reversibility handler.

The reversibility handler can also rerun the process and database calls involving the corrupted data in order to trace the spread of the corrupted data from the source, and determine which, if any, remote processes and databases may have used the corrupted data. The remote processes and databases can be located in any number of remote domains. Each of the remote processes and databases using the corrupted data can, in turn, be wrapped in its own reversibility handler and rerun in the same manner, in order to trace any further spread of corrupted data. When the remote processes and databases are traced in this manner their reversibility handlers can use transaction logs that are local to the remote processes or databases. In this manner, the locations to which the corrupted data has spread can be traced and located by the data recovery method 10 within the identify phase 100, and the corrupted data located by the reversibility handlers can be labeled as tainted.

When the identify phase 100 is completed, the data recovery method 10 can enter the repair phase 200. In the repair phase 200, a reversibility handler is wrapped around the source of corrupted data, and the flow of the process or the database calls is again recreated. As the recreation of the process proceeds, the data determined to be corrupted in the identify phase 100 is repaired using the good data and the timestamp used in the identify phase 100. The data recovery method 10 can then enter the untaint phase 300. In the untaint phase 300 the data labeled as tainted during the identify phase 100 can be relabeled as untainted, since it is repaired during the repair phase 200.

Figure 2A:
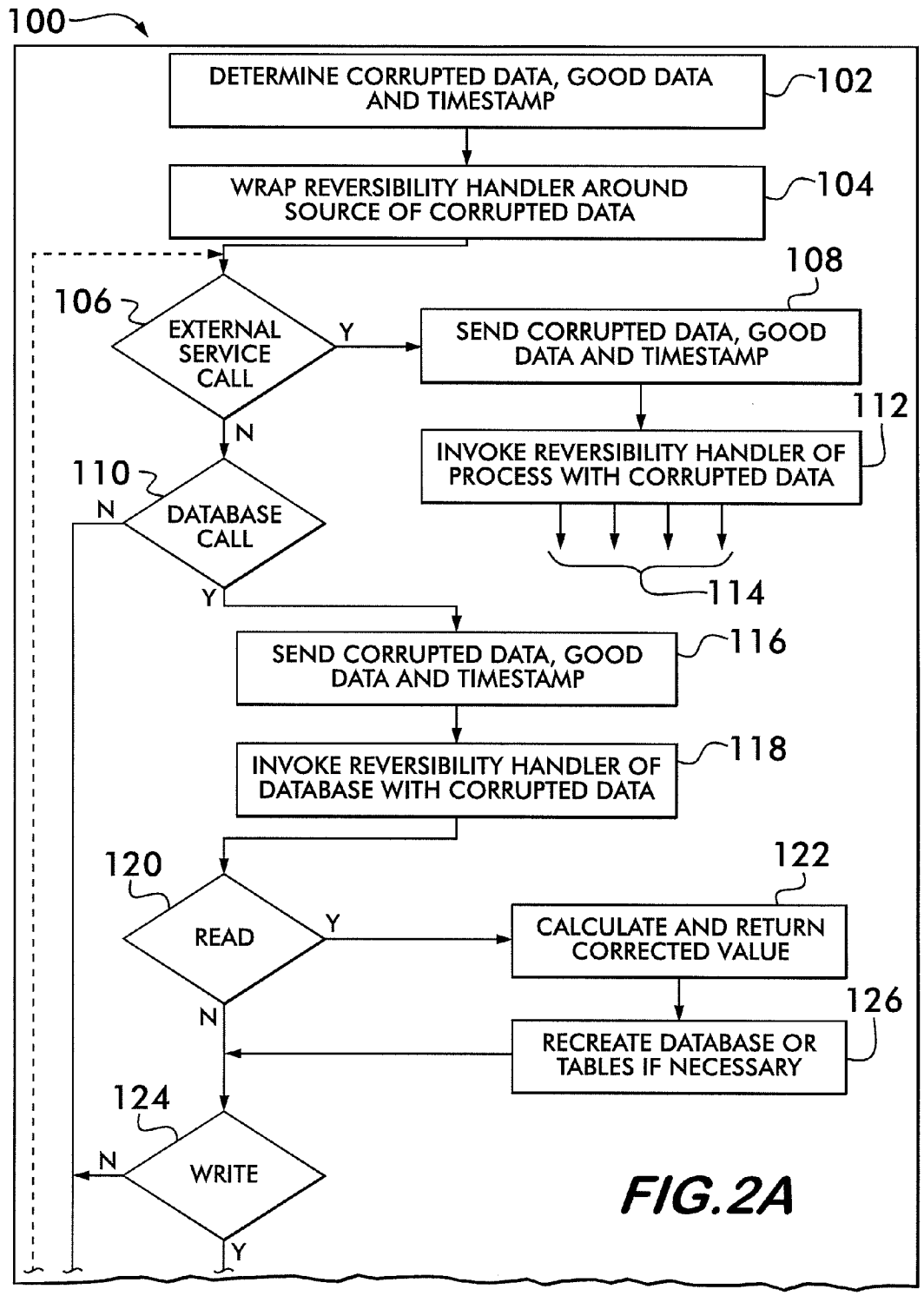
FIGS. 2A-B show a more detailed block diagram representation of an embodiment of an identify phase portion of the data recovery method of FIG. 1.
Figure 2B:
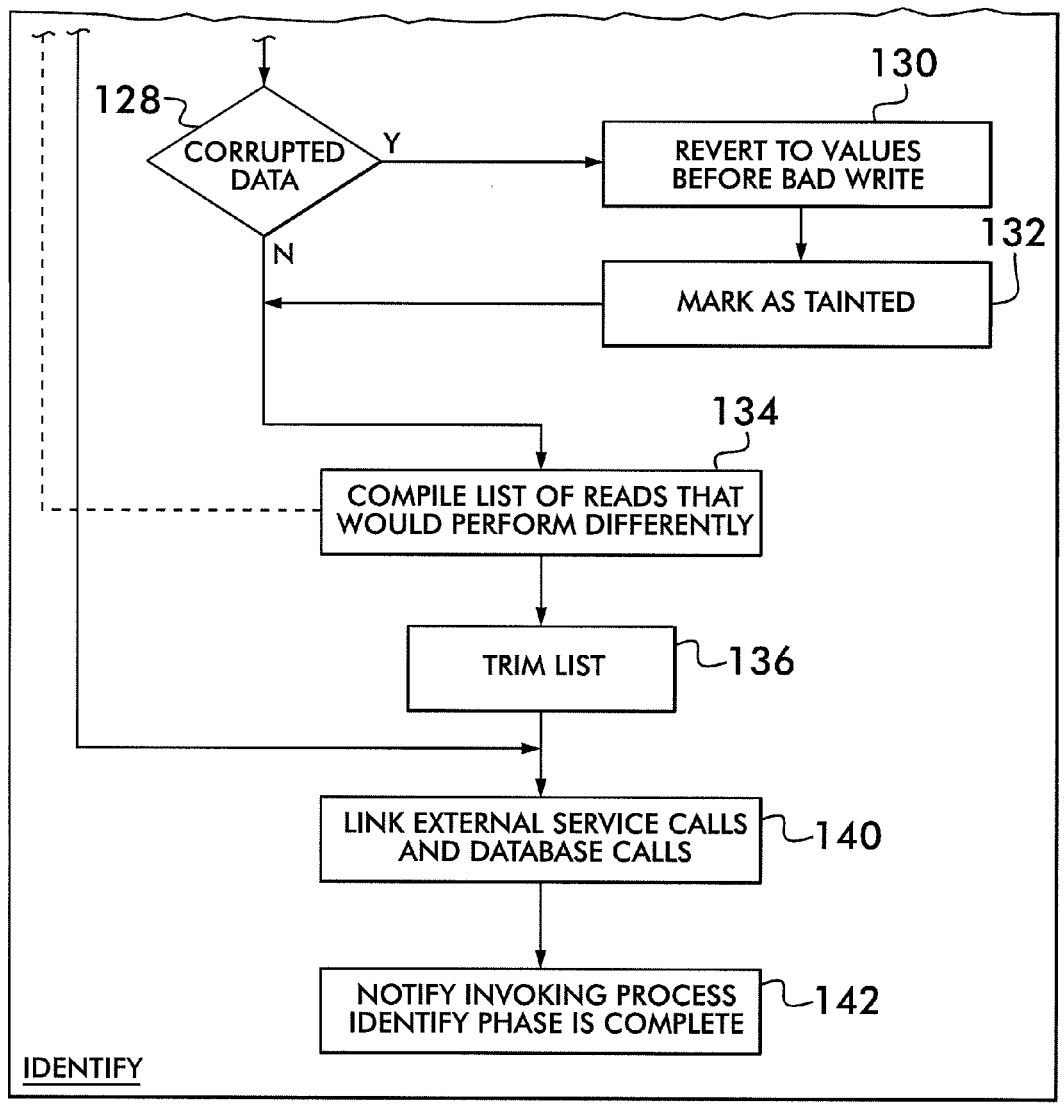

Referring now to FIGS. 2A-B, there is shown a more detailed block diagram representation of a preferred embodiment of the identify phase 100 of the data recovery method 10. In the identify phase 100 the corrupted data, the good data and the timestamp are determined, as shown in block 102. The timestamp can be the last time that the data was known to be good, or at least the first time when the data was suspected of being corrupted. The determinations of block 102 can be made using any methods known to those skilled in the art. As previously described, the source of the corrupted data can be a process or a database. A reversibility handler is wrapped around the source of the corrupted data as shown in block 104. The reversibility handler is a program for intercepting all calls into and out of the source of the corrupted data that it is wrapped around, during any time windows when corrupted data is believed to have existed.

If the source of the corrupted data is a process, a determination is made in determination 106 whether an external call of the corrupted process was made. If an external call was made, the corrupted data, the good data and the timestamp, as determined in block 102, are sent to the reversibility handler of the corrupted process, as shown in block 108. The reversibility handler wrapped around the corrupted process is then invoked as shown in block 112 in order to recreate the flow of the corrupted process.

A recreation of the flow of the corrupted process proceeds by running the process, wrapped with its reversibility handler. The recreation of the process flow can be facilitated by making use of the local transaction logs of the wrapped process. The local transaction logs can be used to determine all of the databases that were read or written to by the process at the time of the corrupted data. The wrapped and traced process may thus proceed from block 112, with any number of external calls, to any number of databases, through any number of remote domains, as indicated by arrows 114.

As the recreation of the process flow of the wrapped process proceeds, all corrupted internal data can be marked as tainted. In this manner the identify phase 100 of the data recovery method 10 can trace a corrupted process through time, through multiple domains if necessary, to determine how the corrupted data has spread during any number of time windows. As additional processes are determined to have received corrupted data, each of the additional processes can be wrapped in its own reversibility handler. The operations of the identify phase 100 of the data recovery method 10 can then be performed on each of the additional processes in order to locate any additional propagation of corrupted data.

If the source of the corrupted data is a database, a determination is made whether the database was called, as shown in decision 110. If the corrupted database was called, it is wrapped in a reversibility handler. The corrupted data, the good data and the timestamp, as previously determined in block 102, are sent to the reversibility handler of the corrupted database, as shown in block 116. The reversibility handler is then invoked as shown in block 118, in order to intercept all accesses of the database. A determination can then be made whether the corrupted data was read, as shown decision 120. If the corrupted data was read, the corrected value of the data is calculated as shown in block 122 based on the good data and the timestamp sent in block 116. The corrected value is understood to be the value that would have been determined if the good data, rather than the corrupted data, had been read from the corrupted database at the time of the bad read of the database. Parameters such as database values, database indices and database tables of the wrapped database can be repaired as necessary, as shown in block 126.

A determination can also be made whether there was a write command to the database, as shown in decision 124. Additionally, a determination can be made whether corrupted data was written to the database, as shown in decision 128. If corrupted data was not written to the database, it is not necessary to take any action. If, however, it is determined that corrupted data was written to a field in the database, the data in the field can be reverted to the value before the bad write, as shown in block 130. Each of the reverted fields can be labeled tainted, as shown in block 132. As shown in block 134, the identify phase 100 can then compile a list of the reads and writes of the database that were performed from the time of a timestamp up to a current time, that would have been performed differently if the data was not corrupted. This list of incorrect accesses can be trimmed by removing any commands after a good write as shown in block 136. If multiple fields are involved, time frames specific to each of the fields involved can be determined.

Some of the reads in the list of reads complied in block 134 may have resulted in the corruption of additional databases. As additional databases are determined to have received corrupted data, each of the additional databases can be wrapped in its own reversibility handler. The operations of the identify phase 100 of the data recovery method 10 can then be performed on each of the additional databases, using its own reversibility handler. In these cases the invocation of the identify phase 100 can receive the timestamp or identification sent by the process performing the bad write. The reversibility handler of the additional databases may also be able to look up other process inputs and other data from the process performing the bad write, and trace the process up to the point that the database command was issued.

It will be understood that a wrapped source may have calls involving databases or database fields that are not corrupted. Under these circumstances, the calls can be permitted to pass through the wrapper without performing the operations of the data recovery method 10. In a preferred embodiment of the invention, any applications that are taint aware can be notified when data is tainted, since they may have special ways of treating tainted data, and may have special custom handlers to execute additional process. For example, some applications may send an email to a system administrator or notify customers if their data is determined to be corrupted.

Each call invocation and database call within the identify phase 100 is linked to the identification of the original identify request received by the reversibility handler as shown in block 140, for example using a timestamp. Furthermore, each call invocation and database call can be stored in a record local to the reversibility handler. The identification of a request is negotiated between the process or database reversibility handler that initiates the identify request, and the process or database reversibility handler that receives the request. When the identify phase 100 is complete, the process invoking the data recovery method 10 is notified, as shown in block 142. Execution of the data recovery method 10 can then proceed to the repair phase 200, using the list of database accesses that was compiled in block 134.

Figure 3:
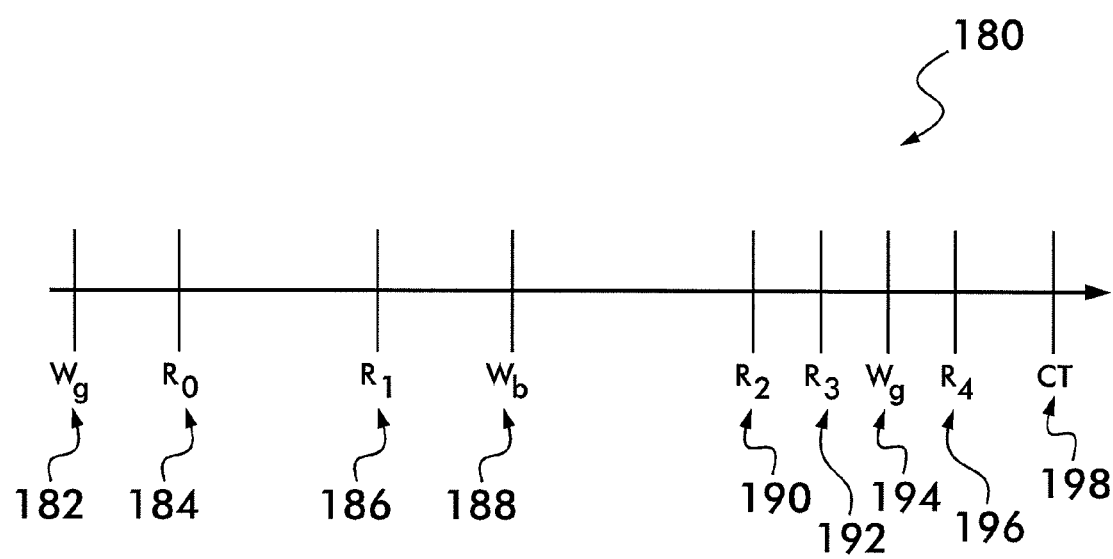
FIG. 3 shows a time line of events that can occur in an embodiment of the data recovery method of FIG. 1.

Referring now to FIG. 3, there is shown a time line 180. The time line 180 shows a series of database reading and writing events which can occur in an embodiment of the data recovery method 10. A time window during which corrupted data exists, and must therefore be identified and repaired, is illustrated by the time line 180. The time line 180 shows two good writes $W_g$ 182 and $W_g$ 194, wherein good data was written to a field F in a database. Five reads $R_0$ 184, $R_1$ 186, $R_2$ 190, $R_3$ 192 and $R_4$ 196 of the field F are also shown. Additionally, a bad write $W_b$ 188, wherein corrupted data was written to the field F, and the current time CT 198 are shown in the time line 180.

Thus, in the example shown in the time line 180, a good write $W_g$ 182 is performed into the field F, and followed by two good reads $R_0$ 184 and $R_1$ 186, before the bad write $W_b$ 188 occurs. Accordingly, the data that is read from the field F in the two reads $R_0$ 184 and $R_1$ 186 is not corrupted. However, the two additional reads $R_2$ 190 and $R_3$ 192 are performed after the bad write $W_b$ 188. Thus, the data read from the field F during the reads $R_2$ 190, and $R_3$ 192 can be assumed to be corrupted. A good write $W_g$ 194 is performed after the bad write $W_b$ 188. The good write $W_g$ 194 overwrites any corrupted data in the field F, and the data recovery method 10 can assume that the field F contains good data after the good write $W_g$ 194 since known good information is written to the field.

For example, the good write $W_g$ 194 into the field F can be followed by another read $R_4$ 196. The data obtained from the field F after the good write $W_g$ 194, for example the data obtained in the read $R_4$ 196, can be assumed to be good by the data recovery method 10. Thus, the reversibility handlers of the identify phase 100 do not need to trace further accesses to the field F by the wrapped source after the good write $W_g$ 194.

Accordingly, the reversibility handlers of the identify phase 100 can trace accesses to the field F that are made during the time window from $W_b$ 188 to $W_g$ 194, in order to help identify any processes that may have received corrupted data from the field F. It will be understood that such accesses to the field F during the window defined from $W_b$ 188 to $W_g$ 194 may have been made from any number of different processes, running in any number of different domains, for example running on different domains at different customer sites. Furthermore, any databases that are corrupted by such processes, because of the corrupted data from the field F, can also be traced. In a preferred embodiment of the invention the local transaction logs of the processes and databases are used in this tracing process.

Figure 4:
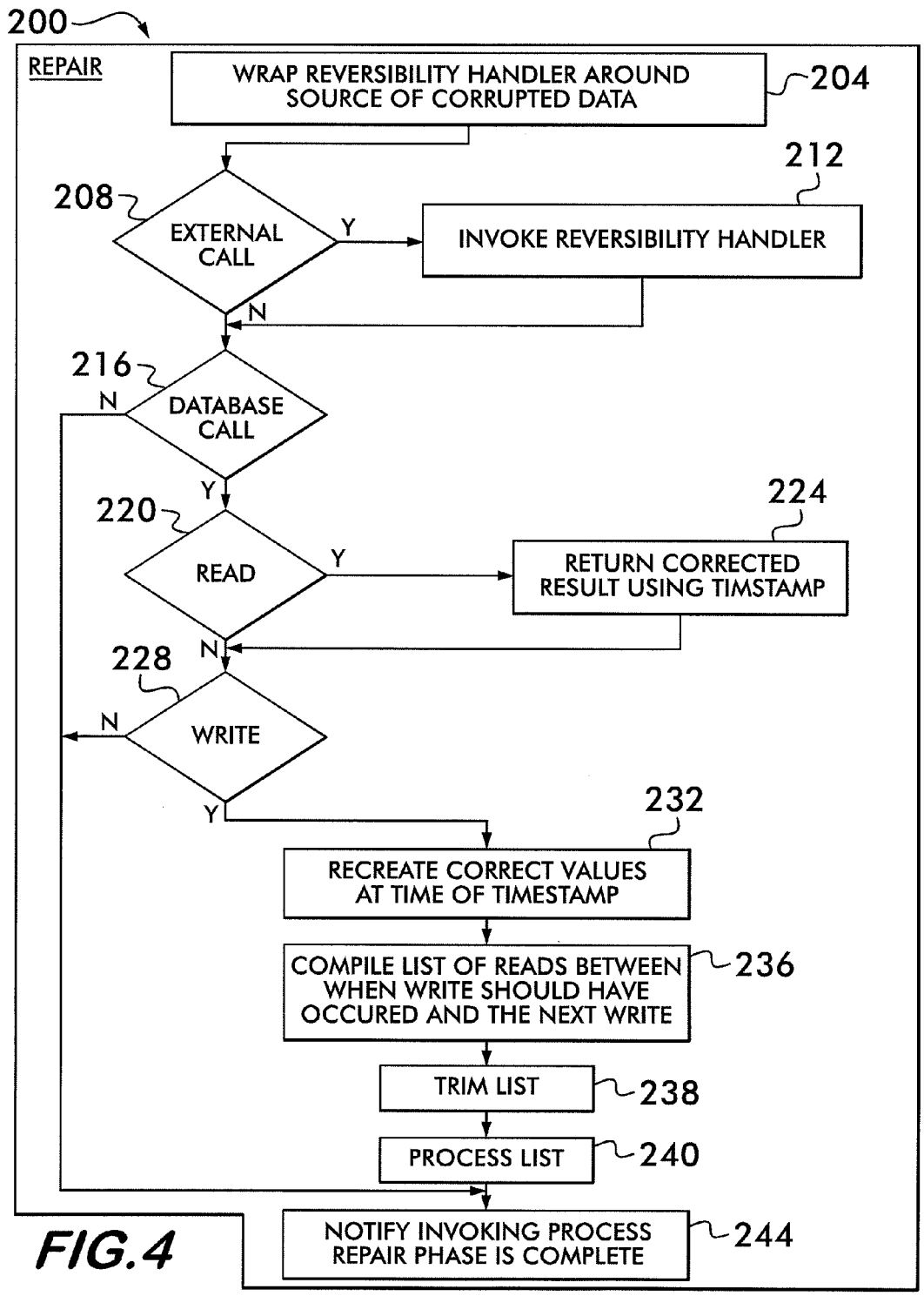
FIG. 4 shows a more detailed block diagram representation of an embodiment of a repair phase portion of the data recovery method of FIG. 1.

Referring now to FIG. 4, there is shown a more detailed block diagram representation of a preferred embodiment of the repair phase 200 of the data recovery method 10. Within the repair phase 200 a reversibility handler is wrapped around the source of corrupted data, as shown in block 204. This permits the repair phase 200 to trace the spread of the corrupted data from the source, as previously described. The source of the corrupted data can be a process or a database. If the source was a process and an external call was made, as determined in decision 208, the reversibility handler of the corrupted process is invoked, as shown in block 212. The reversibility handler of the corrupted process performs the repairs using the good data and the timestamp of block 102, following the recreated process flow of the wrapped process.

If the source of the corruption is a database a determination is made whether the database was called in decision 216. If the corrupted database was called, a determination is made in decision 220 whether the corrupted database was read. If the corrupted database was read, the corrected results of the read are determined in block 224 using the good data and the timestamp.

If the database was written, as determined in decision 228, an historical table is recreated for the timestamp, and the table is updated in block 232. The repair phase 200 can then compile and trim a list of the read operations performed between the write command being processed, and the next write operation that overwrites the corrupted data, as shown in block 236. For example, the list of write operations performed between the bad write $W_b$ 188 and the good $W_g$ 194 in the time line 180 can be compiled in block 236. Furthermore, a determination can be made that the reads $R_2$ 190 and $R_3$ 192 were performed incorrectly.

The list of bad reads can be trimmed as shown in block 238, using any further information about subsequent good writes that have overwritten corrupted data that may be available. The reads on the list of bad reads can then be processed as shown in block 240. The processing of the list can be substantially as described with respect to the identify phase 100, except that in the repair phase 200 the processed data is not marked as tainted. For example, the correct values of the reads $R_2$ 190 and $R_3$ 192 can be determined using the good data and timestamp of block 102. The process that invoked the repair phase 200 can then be notified that the repair process is completed, as shown in block 244.

Figure 5:
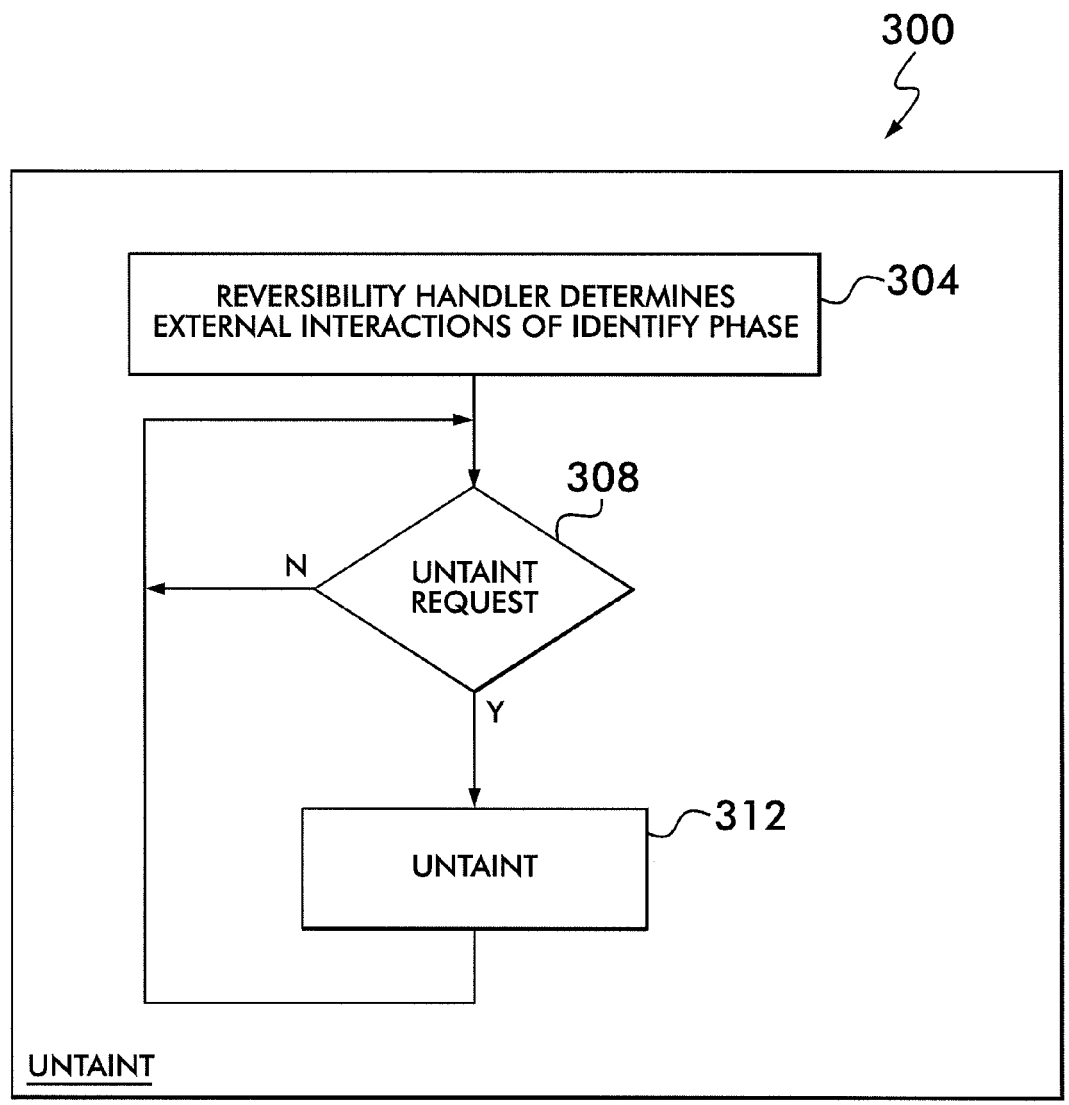
FIG. 5 shows a more detailed block diagram representation of an embodiment of an untaint phase portion of the data recovery method of FIG. 1.

Referring now to FIG. 5, there is shown a more detailed block diagram representation of a preferred embodiment of the untaint phase 300 of the data recovery method 10. In block 304 of the untaint phase 300 a reversibility handler can compile a list of all of the external interactions that occurred as a result of the corrupted data discovered in block 50. The chain of interactions determined in block 304 can be saved locally by the reversibility handlers invoked in the phases 100, 200 of the data recovery method 10, and untaint requests can be provided to the databases saving the interactions. Where there are untaint requests for data in the databases, as determined in decision 308, the data can be marked untainted, as shown in block 312, since it was repaired in the repair phase 200.

The operations of the data recovery method 10 can be facilitated if all data in the program state is persisted from the local memory of the applications to a database, although a preferred embodiment of the data recovery method 10 can accommodate non-persisted program states as well. Furthermore, consistency or logic problems should not arise if operations are executed in sequence. All time can be synchronized between all service components and reversibility handlers in the preferred embodiment. Furthermore, in the preferred embodiment, the act of performing extra reads to a database should not affect the overall process integrity, and databases can keep records of all existing data history until a time threshold. The time threshold can be greater than or equal to the amount of time it takes to detect and completely repair a data integrity issue. Additionally, in the preferred embodiment, databases can be virtual database and are not parallelized, and each process can have a record of its inputs. The record of the inputs can list the timestamp of the process, as well as the request and response data of all external service calls and database calls incurred by the inputs, along with timestamps for each external interaction and the initial start of the process invocation. Domains which can be traced according to the data recovery method of the invention can be any group of computers and devices on a network that can be administered as a unit with common rules and procedures. For example, within an internet environment, such domains can be defined by IP addresses, wherein devices sharing a common part of an IP address can be understood to be in the same domain While the invention has been described in detail and with reference to specific examples thereof, it will be apparent to one skilled in the art that various changes and modifications can be made therein without departing from the spirit and scope thereof.

What is claimed is:

1. A computer-implemented method for recovering data when corrupted data from a source is detected, comprising:
    tracing propagation of the corrupted data to provide identified corrupted data;
    determining good data and a timestamp both corresponding to the corrupted data, wherein the good data and the timestamp are utilized to compile a list of accesses of the corrupted data; and
    repairing the identified corrupted data in accordance with the list of accesses.

2. The method of claim 1, further comprising tracing the propagation of the corrupted data from a first domain to a second domain.

3. The method of claim 2, further comprising repairing the corrupted data in both the first domain and the second domain.

4. The method of claim 1, further comprising providing a wrapper for the source.

5. The method of claim 4, further comprising intercepting calls into and out of the source by the wrapper.

6. The method of claim 5, further comprising intercepting calls of a plurality of different domains by the wrapper.

7. The method of claim 4, further comprising providing the wrapper for a process.

8. The method of claim 7, further comprising intercepting external service calls of the process by the wrapper.

9. The method of claim 8, further comprising the wrapper recreating a process flow followed by the process in accordance with the corrupted data.

10. The method of claim 4, further comprising providing the wrapper for a database.

11. The method of claim 10, further comprising intercepting accesses of the database by the wrapper.

12. The method of claim 11, further comprising intercepting the accesses of the database in accordance with a time window defined by a bad write to the database and a good write to the database.

13. The method of claim 1, further comprising determining corrected data in accordance with the good data and the timestamp.

14. The method of claim 13, further comprising repairing corrupted data in accordance with the corrected data.

15. The method of claim 1, further comprising trimming the list in accordance with a good write.

16. The method of claim 1, further comprising marking the corrupted data as tainted.

17. The method of claim 16, further comprising marking the corrupted data as untainted after it is repaired.

* * * * *